(12) United States Patent
Sommer et al.

(10) Patent No.: US 6,688,383 B1
(45) Date of Patent: Feb. 10, 2004

(54) COOLING A CONTROL DEVICE OF THE GEARBOX OF A MOTOR VEHICLE

(75) Inventors: Stefan Sommer, Saulgau (DE); Bernd Fessler, Kressbronn (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/857,093

(22) PCT Filed: Nov. 25, 1999

(86) PCT No.: PCT/EP99/09111

§ 371 (c)(1),
(2), (4) Date: May 31, 2001

(87) PCT Pub. No.: WO00/32967

PCT Pub. Date: Jun. 8, 2000

(30) Foreign Application Priority Data

Dec. 1, 1998 (DE) .......................................... 198 55 321

(51) Int. Cl.$^7$ ............................................... F28F 27/00
(52) U.S. Cl. .................... 165/200; 165/202; 165/43; 165/300; 123/41.34; 123/41.42; 74/606 A; 180/339
(58) Field of Search .......................... 165/202, 41, 42, 165/43, 44, 51, 200, 300, 916; 123/41.31, 41.33, 41.34, 41.42; 74/606 A; 180/339

(56) References Cited

U.S. PATENT DOCUMENTS

| | | | | |
|---|---|---|---|---|
| 3,752,222 A | * | 8/1973 | Olbermann, Jr. | |
| 4,271,728 A | | 6/1981 | Wakamatsu | 74/866 |
| 4,393,922 A | * | 7/1983 | Bährle et al. | 165/41 |
| 4,690,017 A | * | 9/1987 | Taniguchi et al. | |
| 4,713,982 A | * | 12/1987 | Fluegel et al. | |
| 5,105,875 A | * | 4/1992 | McArthur | 165/202 |
| 5,361,650 A | | 11/1994 | Klecker et al. | 74/606 R |
| 5,441,099 A | * | 8/1995 | Yasso | 165/41 |
| 5,662,007 A | * | 9/1997 | Stärker et al. | 74/606 A |
| 5,678,461 A | * | 10/1997 | Stine | 74/606 A |
| 5,875,866 A | * | 3/1999 | Dorfschmid et al. | |
| 5,878,630 A | | 3/1999 | Fessler et al. | 74/606 A |
| 5,927,384 A | * | 7/1999 | Waldner, Jr. | 165/44 X |

FOREIGN PATENT DOCUMENTS

| | | |
|---|---|---|
| DE | 34 03 435 A1 | 8/1984 |
| DE | 195 17 491 A1 | 11/1996 |
| DE | 197 10 931 A1 | 10/1997 |
| EP | 0 697 080 B1 | 3/1997 |

* cited by examiner

Primary Examiner—Ljiljana Ciric
(74) Attorney, Agent, or Firm—Davis & Bujold, PLLC

(57) ABSTRACT

A method of adjusting an operating temperature of a control device (2) of a motor vehicle automatic transmission. The transmission control has a hydraulic unit (3) and an electronic unit (4) with electronic modules. The control device (3) is situated in a transmission housing which is partially filled with transmission oil and at least partly surrounded by transmission oil. The control device (2) has a cooling device (5) by which at least part of the electronic unit (4) is cooled with the transmission oil. The transmission oil has a temperature $\Theta_C$ which is lower than a prevailing transmission oil temperature $\Theta_G$. The electronic unit (4) is impinged upon with a defined volume flow of the transmission oil.

10 Claims, 2 Drawing Sheets

COOLING A CONTROL DEVICE OF THE GEARBOX OF A MOTOR VEHICLE

FIELD OF THE INVENTION

The invention relates to a method for reducing the operating temperature of a control device of a motor vehicle, especially of an automatic transmission, and to a transmission control having an electronic unit with, an electronic module and a hydraulic unit wherein the control device is situated in a transmission housing partly filled with oil and at least partly surrounded by oil.

BACKGROUND OF THE INVENTION

It is known practice to place a control device for an automatic transmission outside the transmission housing and to connect control elements such as actuators via pipes situated in the transmission housing with the control device via pipes.

In DE 197 10 913 A1 discloses a transmission control especially for an automatic transmission in which the electrohydraulic control device and the electronic control device are placed together in a control housing in or directly on the transmission housing. For cooling the electronic control device to an acceptable temperature, there is provided a special cooling pipe plate with cooling pipes which are spatially disposed between the electrohydraulic and the electronic control devices. Transmission oil or engine cooling water flows through the cooling pipes which preferably lie in the cooler reflux.

However, this solution is disadvantageous because a long run of cables between the control means and the control device is required and additional space is needed for the control device placed outside the transmission housing.

In U.S. Pat. No. 4,271,728 and in EP 0 697 080, a solution is proposed which solves the problem of an additional space requirement due to the control unit being disposed in the oil sump of a transmission, the electric connections between the control electronics and the control means being designed as rigid wires according to EP 0 697 080.

In this known solution for cooling heat-producing electronics it s provided that heat is transferred via cooling fins to the transmission oil of the oil sump that surrounds the control electronics.

However, the cooling of the control electronics by merely surrounding the same with transmission oil proves problematic in operating situations with transmission oil at high temperatures. Especially in modern automatic transmissions the oil can reach temperatures of more than 100° C. In such operating situations, the transmission oil can no longer absorb the amount of heat generated by the electronic components of the control electronics resulting in overheating of the electronic components Interruptions in the transmission control or complete failure of the control electronics also result.

Therefore; the problem to be solved by this invention is to make available a method for adjusting the operating temperature of a control device of a motor vehicle transmission and a transmission control wherein the control device is situated in the transmission housing surrounded by oil and the electronic modules of the control device are reliably protected against overheating.

SUMMARY OF THE INVENTION

The inventive method for targeted cooling of the electronic unit of a control device and the inventive development of the transmission control makes it possible to use the advantages of disposing the control device in the oil sump of the transmission with corresponding need of small space and short connections to the actuators.

The inventive solution further ensures that the power losses of the electronic modules are reliably removed and that the operating temperature is always kept low to prevent an interruption due to local overheating on an electroplate.

Thereby is not only the reliability of the transmission control increased but the service life of the electronic components is also extended.

BRIEF DESCRIPTION OF THE DRAWING(S)

Other advantages and advantageous developments of the invention will now be described here below with reference to the drawings in which.

DETAILED DESCRIPTION OF THE INVENTION

Figure 1:
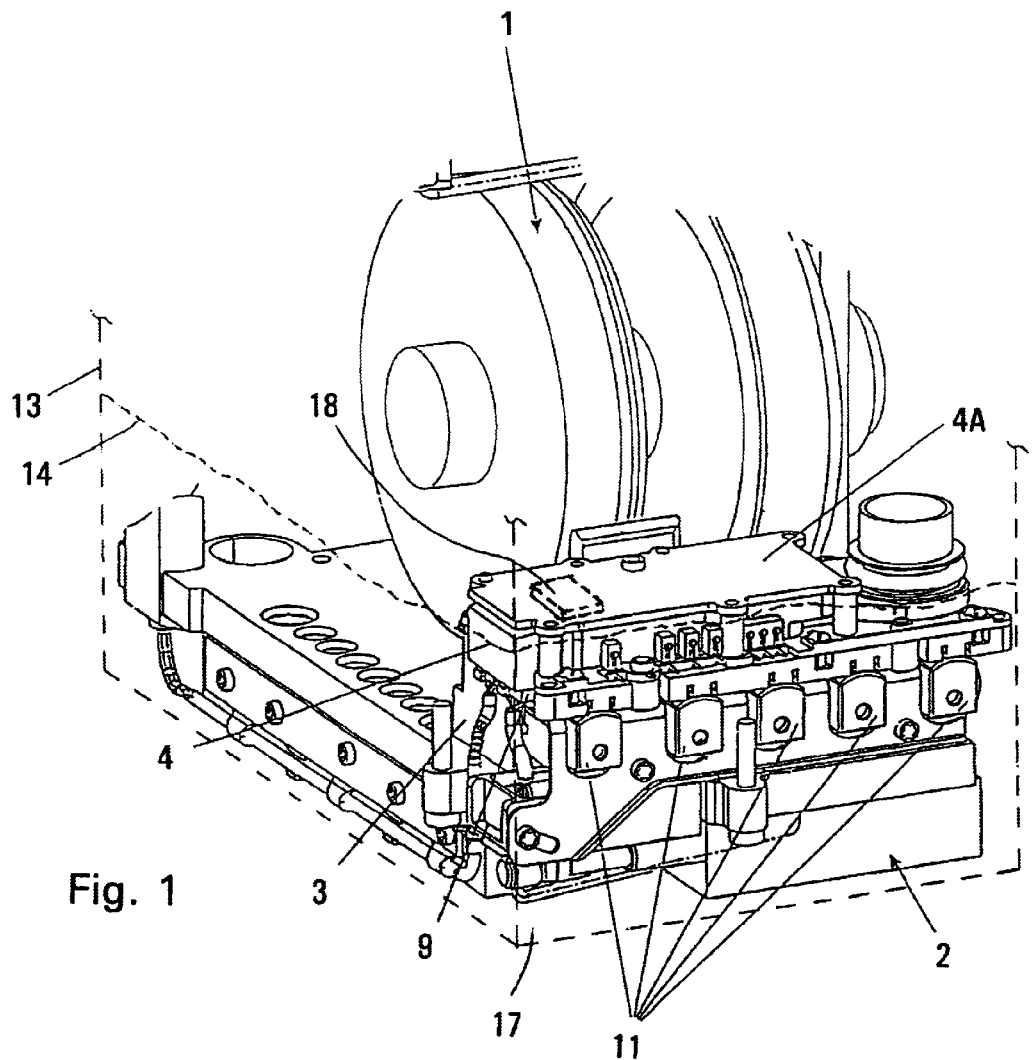
FIG. 1 is a diagrammatic representation of one part of an automatic transmission with a control device of a transmission control situated in an oil sump.
Figure 2:
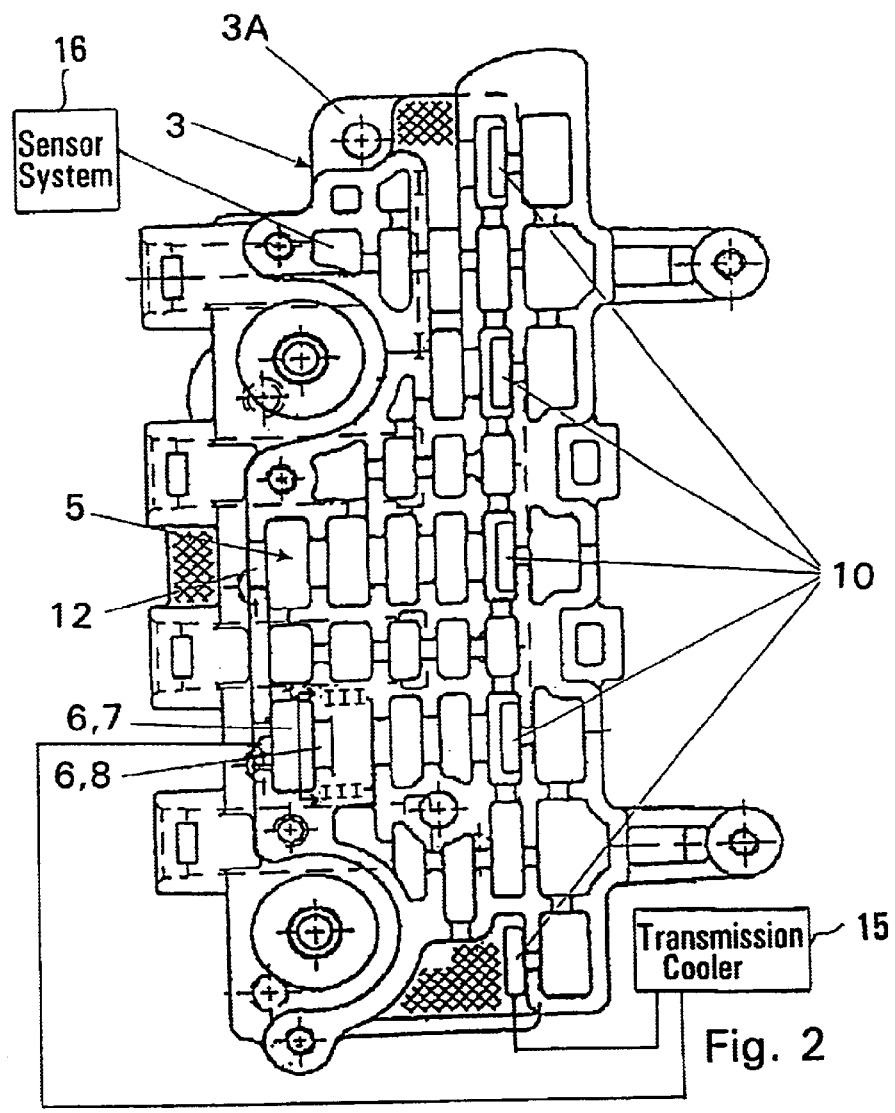
FIG. 2 is a top view on a hydraulic unit of the control device according to FIG. 1 with a cooling device.
Figure 3:
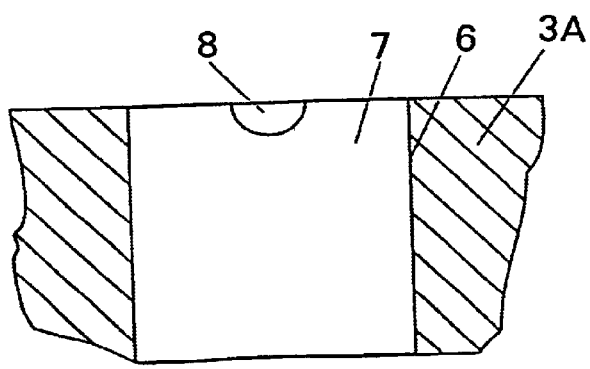
FIG. 3 is a partial section through a cooling pipe of the cooling device along the line III—III in FIG. 2.

Referring to FIGS. 1 and 2, one part of an automatic transmission for a motor vehicle can be diagrammatically seen, having a variator 1 and a control device 2 of an electrohydraulic transmission control which is disposed in a transmission housing 13 (not shown in detail).

The control device 2, which for the purpose of signal transmission transmission of signals is connected with electric, mechanical and hydraulic control elements of the transmission (not designated in detail), has a hydraulic unit 3 and an electronic unit 4 which surrounds an electronic module 18. In the instant embodiment, the hydraulic control device 2 is entirely surrounded by oil 14 in the transmission housing 13.

In order to keep the operating temperature of the control device 2 and, in particular of the electronic unit 4 at low level even at a high temperature $\Theta_G$ of the transmission oil 14, the control device 2 has a cooling device 5 by means of which the electronic unit 4 is in contact with a defined volume flow of coolant having a temperature $\Theta_G$ which is lower than the prevailing temperature $\Theta_G$ of the transmission oil.

As coolant is used, transmission oil which, before being fed to the electronic unit 4, has been cooled in a transmission cooler 15.

As can be seen in FIG. 2, the cooling device 5 is designed in a valve housing 3A of the hydraulic unit 3 with cooling pipes 6 which border on the electronic unit 4. The cooling pipes 6 have here, in the area of electronic modules, which constitute power-building elements and generate a correspondingly large amount of heat, a larger cross-sectional surface and thus a larger heat-exchange surface. The cooling pipes 6 are formed in the valve housing 3A as a kind of labyrinth with basin-like enlargements 7 and narrow connecting grooves 8.

By means of the enlargements 7 and the connecting grooves 8, the flow rate of the coolant and thus the heat-exchange time at different places in the cooling device 5 vary in a defined manner according to the heat generation of the electronic modules of the electronic unit 4.

Toward the hydraulic unit 3, the electronic unit 4 has a base plate 9 made of aluminum upon which is glued a ceramic plate (not shown) with electronic modules. Toward the top, the electronic unit 4 is tightly closed with a lid 4A against the oil sump.

FIG. 2, which is a top view on the hydraulic unit 3 with the cooling pipes 6 without the electronic unit 4 and the base plate 9 thereof, shows that the cooling pipes 6 are designed open in a direction to the base plate 9. Thereby the base plate 9 is directly contacted with coolant with the largest possible heat-exchange surface.

The volume flow of the coolant is provided in a manner such that the coolant coming from a transmission cooler 15 is fed to the hydraulic unit 3 through inlet openings 10 in the area of actuators 11 of the control device 2. From the inlet openings 10, the coolant passes into the cooling pipes 6 upwardly and overflows the base plate 9. Thereafter it is removed, via outlet openings 12, into the oil so sump 17.

In the instant embodiment, the cooling can be switched in as needed, the electronic unit 4 being cooled with regulation according to its operating temperature determined by a sensor system 16.

However, it obviously can also be provided that the electronic unit 4 be cooled when the transmission oil temperature $\Theta_G$ exceeds a predefined $\Theta_{limit}$.

Reference Numerals 1 variator
2 control device
3 hydraulic unit
3A valve housing
4 electronic unit
4A lid
5 cooling
6 cooling pipe
7 enlargement
8 connecting groove
9 base plate
10 inlet opening
11 actuator
12 outlet opening
13 transmission housing
14 transmission oil
15 transmission cooler
16 sensor system
17 transmission oil sump
18 electronic module

What is claimed is:

1. A method of regulating an operating temperature of a control device of an automatic transmission of a motor vehicle, the control device having a hydraulic unit and an electronic unit with at least one electronic module, the control device being located inside a housing of the automatic transmission, and the housing being at least partially filled with transmission oil, the method comprising the steps of:
    at least partially surrounding the control device with the transmission oil;
    cooling the transmission oil when a temperature of the transmission oil is higher than a predefined limit value ($\Theta_{grenz}$), with a transmission cooler having a coolant with a coolant temperature ($\Theta_C$), the coolant temperature ($\Theta_C$) being lower than the prevailing oil temperature ($\Theta_G$) in the automatic transmission, prior to conveying the transmission oil to the at least one electronic module;
    selecting at least one of a duration of heat exchange between the transmission oil and the at least one heat-exchange surface, a temperature ($\Theta_G$) of the transmission oil and a flow rate of the transmission oil across the at least one heat-exchange surface to control cooling of the at least one heat-exchange surface,
    cooling the electronic unit (4) with specific flow of the transmission oil; and
    controlling the cooling of the electronic unit (4) based on the operating temperature of the electronic unit (4) as determined by a sensor system.

2. A temperature control apparatus, including a control device, for an automatic transmission of a motor vehicle, the apparatus controlling the operating temperature of the automatic transmission the apparatus comprising:
    an automatic transmission housing at least partially filled with transmission oil, the housing accommodating the control device (2) therein, an electronic unit (4) including at least one electronic module (18) which generates heat during operation of the automatic transmission, and a hydraulic unite (3), and the control device (2) being at least partially surrounded with the transmission oil; and
    the hydraulic unit (3) having a cooling device (5) comprising:
        a plurality of cooling pipes (6) associated with the control device (2) such that at least a portion of the electronic unit (4) contacts at least one of the plurality of cooling pipes (6) to remove heat from the electronic unit and, the cooling pipes being filled with the transmission oil, the transmission oil having a temperature ($\Theta_C$) lower than an oil temperature ($\Theta_C$) prevailing in the automatic $\Theta_C$ transmission, the plurality of cooling pipes (6) being located alongside the electronic unit (4) such that an increased heat-exchange surface between the plurality of cooling pipes (6) and the electronic unit (4) is directly associated with the one at least one electronic module, and the plurality of cooling pipes (6) are partially defined by a base plate (9) of the electronic unit (4).

3. The apparatus of claim 2, wherein the plurality of cooling pipes (6) are interconnected such that the transmission oil enters the hydraulic unit (3) trough inlet openings (10), in an area of actuators (11), and flows over the base plate (9) and exits the hydraulic unit (3) through outlet openings (12) before flowing to a transmission oil sump of the automatic transmission.

4. The apparatus of claim 3, wherein the control device further comprises a sensor system for sensing an operating temperature of the automatic transmission and for regulating cooling of the electronic unit (4).

5. The apparatus of claim 2, wherein the plurality of cooling pipes (6) have enlargements (7) and narrow connecting grooves which together improve heat transfer in specific areas of the automatic transmission.

6. The apparatus of claim 2, wherein the automatic transmission includes a variator.

7. The apparatus of claim 2, wherein the plurality of cooling pipes (6) border the electronic unit (4).

8. The apparatus of claim 2, wherein the plurality of cooling pipes (6) are formed in a valve housing (3A) of the automatic transmission.

9. The apparatus of claim 2, wherein the base plate (9) is made of aluminum.

10. The apparatus of claim 2, wherein a lid (4A) closes a top of the electronic unit (4).

* * * * *